United States Patent
Burpo et al.

(10) Patent No.: US 9,724,891 B2
(45) Date of Patent: *Aug. 8, 2017

(54) BEAD-STIFFENED COMPOSITE PARTS

(71) Applicant: The Boeing Company, Chicago, IL (US)

(72) Inventors: Steven J. Burpo, Saint Charles, MO (US); Michael P. Renieri, Marthasville, MO (US); Nicholas B. Segobiano, Saint Louis, MO (US); Neal A. Froeschner, Florissant, MO (US)

(73) Assignee: THE BOEING COMPANY, Chicago, IL (US)

( * ) Notice: Subject to any disclaimer, the term of this patent is extended or adjusted under 35 U.S.C. 154(b) by 270 days.

This patent is subject to a terminal disclaimer.

(21) Appl. No.: 14/552,481

(22) Filed: Nov. 25, 2014

(65) Prior Publication Data

US 2015/0079338 A1    Mar. 19, 2015

Related U.S. Application Data

(62) Division of application No. 13/220,342, filed on Aug. 29, 2011, now Pat. No. 8,916,253, which is a division (Continued)

(51) Int. Cl.
*B32B 3/26* (2006.01)
*B32B 3/10* (2006.01)
(Continued)

(52) U.S. Cl.
CPC ............. *B32B 3/266* (2013.01); *B29C 70/34* (2013.01); *B29C 70/545* (2013.01); *B32B 3/08* (2013.01); *B32B 3/10* (2013.01); *B32B 3/22* (2013.01); *B32B 3/28* (2013.01); *B32B 3/30* (2013.01); *B32B 5/022* (2013.01); *B32B 5/22* (2013.01); *B32B 5/26* (2013.01); *B32B 5/28* (2013.01); *B32B 9/00* (2013.01); *B32B 27/04* (2013.01); *B32B 27/12* (2013.01); *B32B 27/38* (2013.01);

(Continued)

(58) Field of Classification Search
CPC ....... Y10T 42/24628; Y10T 428/24314; Y10T 428/24339; B32B 3/266; B32B 3/10; B32B 3/30; B32B 37/18; B32B 38/04; B32B 38/0012; B32B 2038/045; B32B 2305/08; B32B 2250/03

See application file for complete search history.

(56) References Cited

U.S. PATENT DOCUMENTS 2,726,396 A    12/1955  Rosenberg
3,042,562 A     3/1962  Peterson (Continued)

OTHER PUBLICATIONS

Office Action, dated Jul. 8, 2010, regarding U.S. Appl. No. 12/409,742, 22 pages.

(Continued)

*Primary Examiner* — Donald J Loney

(74) *Attorney, Agent, or Firm* — Yee & Associates, P.C.

(57) ABSTRACT

A beaded composite panel is fabricated using composite plies. An opening is formed in each of plies, and each ply is laid up on a bead feature and drawn down over the bead feature in the area of the opening so as to widen the opening into a gap allowing the ply to conform to the contour of the bead feature. Patches are fabricated and placed on the plies overlying over the openings. The laid-up plies are compacted and cured.

7 Claims, 6 Drawing Sheets

Related U.S. Application Data of application No. 12/409,742, filed on Mar. 24, 2009, now Pat. No. 8,052,826.

(51) Int. Cl.

| | | |
|---|---|---|
| *B29C 70/34* | (2006.01) | |
| *B29C 70/54* | (2006.01) | |
| *B32B 3/22* | (2006.01) | |
| *B32B 3/28* | (2006.01) | |
| *B32B 5/26* | (2006.01) | |
| *B32B 5/28* | (2006.01) | |
| *B32B 9/00* | (2006.01) | |
| *B32B 27/04* | (2006.01) | |
| *B32B 27/12* | (2006.01) | |
| *B32B 27/38* | (2006.01) | |
| *B32B 3/30* | (2006.01) | |
| *B32B 37/18* | (2006.01) | |
| *B32B 38/00* | (2006.01) | |
| *B32B 38/04* | (2006.01) | |
| *B32B 5/02* | (2006.01) | |
| *B32B 5/22* | (2006.01) | |
| *B32B 3/08* | (2006.01) | |
| *B32B 1/00* | (2006.01) | |
| *B29L 31/30* | (2006.01) | |

(52) U.S. Cl.
CPC .......... *B32B 37/18* (2013.01); *B32B 38/0012* (2013.01); *B32B 38/04* (2013.01); *B29L 2031/3076* (2013.01); *B32B 1/00* (2013.01); *B32B 2038/045* (2013.01); *B32B 2250/03* (2013.01); *B32B 2260/021* (2013.01); *B32B 2260/046* (2013.01); *B32B 2262/106* (2013.01); *B32B 2305/08* (2013.01); *B32B 2307/50* (2013.01); *B32B 2307/546* (2013.01); *B32B 2307/58* (2013.01); *B32B 2605/00* (2013.01); *B32B 2605/08* (2013.01); *B32B 2605/18* (2013.01); *Y10T 156/109* (2015.01); *Y10T 156/1026* (2015.01); *Y10T 156/1028* (2015.01); *Y10T 156/1041* (2015.01); *Y10T 156/1056* (2015.01); *Y10T 156/1064* (2015.01); *Y10T 156/1074* (2015.01); *Y10T 156/1082* (2015.01); *Y10T 156/1093* (2015.01); *Y10T 428/20* (2015.01); *Y10T 428/24298* (2015.01); *Y10T 428/24314* (2015.01); *Y10T 428/24322* (2015.01); *Y10T 428/24331* (2015.01); *Y10T 428/24339* (2015.01); *Y10T 428/24479* (2015.01); *Y10T 428/24628* (2015.01)

(56) References Cited

U.S. PATENT DOCUMENTS

| | | |
|---|---|---|
| 4,053,667 A | 10/1977 | Smith |
| 5,015,168 A | 5/1991 | Boime et al. |
| 5,271,986 A | 12/1993 | Dublinski et al. |
| 6,187,411 B1 | 2/2001 | Palmer |
| 6,770,350 B2 | 8/2004 | Arndt et al. |
| 2009/0120562 A1 | 5/2009 | Tsotsis et al. |
| 2010/0136866 A1 | 6/2010 | Kwag et al. |

OTHER PUBLICATIONS

Final Office Action, dated Jan. 3, 2011, regarding U.S. Appl. No. 12/409,742, 18 pages.
Office Action, dated May 9, 2013, regarding U.S. Appl. No. 13/220,342, 14 pages.
Notice of Allowance, dated Aug. 13, 2014, regarding U.S. Appl. No. 13/220,342, 9 pages.
Final Office Action, dated Dec. 18, 2013, regarding U.S. Appl. No. 13/220,342, 11 pages.
Notice of Allowance, dated May 27, 2011, regarding U.S. Appl. No. 12/409,742, 8 pages.

BEAD-STIFFENED COMPOSITE PARTS

This application is a divisional application of U.S. patent application Ser. No. 13/220,342, filed Aug. 29, 2011, which is a divisional application of U.S. patent application Ser. No. 12/409,742, filed Mar. 24, 2009.

BACKGROUND INFORMATION

1. Field

The disclosed embodiments generally relate to stiffened composite parts, and deal more particularly with a method of fabricating beaded composite panels.

2. Background

Composite parts such as panels may be stiffened to resist bending moments using a variety of techniques. One such technique involves forming integral structural features, referred to as "beads", into the panel during layup. Bead-stiffened panels may be fabricated by laying up prepreg plies on a tool that includes raised bead features on a tool surface that determines the shape into which the panel is formed. The tool may also be used to compact and cure the layup.

Beads of sufficiently effective height may be difficult to form because of the difference in effective length that the fibers in the ply must cover; some fibers extend over the flat areas of the tool while other fibers must extend up and over the bead features. Also ply wrinkling may result in the transition areas between different developed fiber lengths.

One solution to the problem mentioned above involves using larger pieces of prepreg than would otherwise be necessary, which are hand-worked down over the bead features while attempting to smooth out wrinkles and avoid excessive applied tension. Another solution involves sandwiching composite plies between sheets of a carrier material such as aluminum sheet metal which are used to mechanically force the plies down over the beads features while maintaining tension in the sandwich. This technique, however, requires the use of specialized equipment and limits the size of the panel to that of the equipment while requiring more consumable materials that are single use. Moreover, because the forming process is hidden from view until it is completed, problems such as ply wrinkling, deformation or breakage may not be detected until the ply has been formed. Still another method involves using specialized "extra-formable" material forms, however these forms are more costly than standard materials and may not be approved or qualified for use in forming certain types of parts.

Accordingly, there is a need for a method of making bead-stiffened composite parts using standard materials and relatively simple tools which may reduce or substantially eliminate wrinkling and/or unacceptable distortion of ply materials during the bead forming process.

SUMMARY

The disclosed embodiments provide a method of fabricating a beaded composite part, such as a beaded panel, using conventional materials and simplified layup tooling. Wrinkling and/or undesirable distortion of ply materials is reduced or eliminated by cutting slits in the plies which allow the ply material to more readily conform to bead features forming part of the tool. Although the slits widen into gaps in the ply as the ply material is being formed over bead features in the tool, sufficient structural strength and stiffness of the resulting beaded panel is maintained by filling and covering the gaps with composite patches during the layup process.

According to one disclosed embodiment, a method is provided of laying up a beaded composite part. The method includes forming an opening in at least one ply and placing the ply on a tool having a raised bead feature, including aligning the opening over the bead feature. A patch is fabricated and placed over the opening in the ply. The opening may be formed by cutting a slit in the ply and cutting darts in the ply at the ends of the slit. The patch may be fabricated by cutting a piece of prepreg cloth into a shape that covers both the slit and the darts.

According to another embodiment, a method is provided of fabricating a beaded composite panel. The method includes cutting a slit in each of a plurality of plies, and laying up the plies on a bead tool, including placing the slit in each ply over a bead feature on the tool. Each of the plies is drawn down over the bead feature in the area of the slit so as to widen the slit into a gap, allowing the ply to conform to the contours of the bead feature. The method also includes at least partially filling the gap with a filler and fabricating patches that are placed on the plies, overlying the filler. Following layup, the plies are cured.

A further embodiment provides a method of fabricating a beaded composite panel. The method includes providing a plurality of unidirectional fiber reinforced prepreg plies and cutting at least one slit in each of the plies in an area where a bead is to be formed. The plies are laid up on a tool having at least one raised bead feature and the slits in each of the plies are forced down over the bead feature. The slits in each of the plies are covered with a prepreg cloth, following which the plies are compacted and cured.

The disclosed embodiments satisfy the need for an improved method of making a beaded composite part, especially composite panels which reduces or eliminates wrinkling and/or undesirable stretching of material during the layup process.

DETAILED DESCRIPTION

Figure 1:
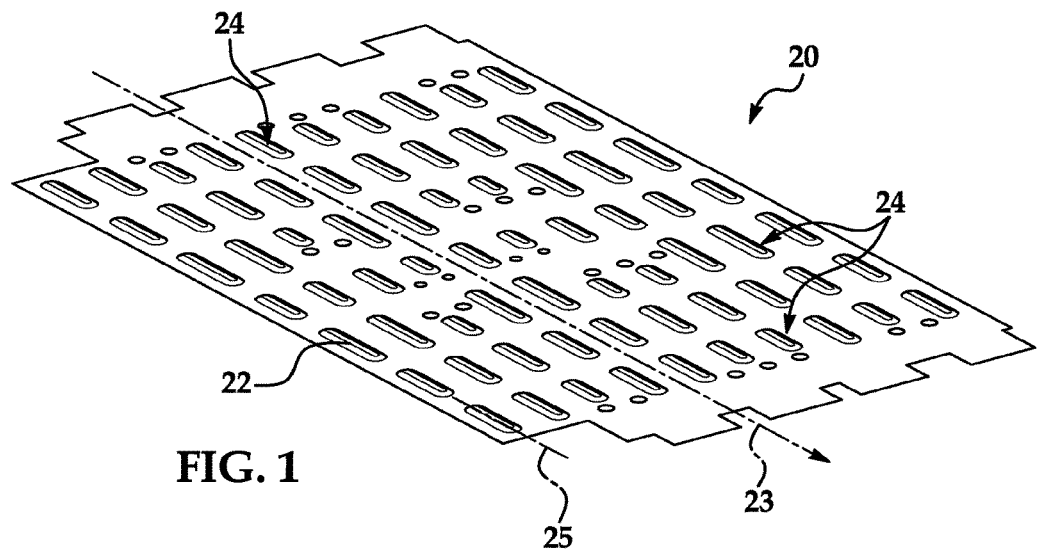
FIG. 1 is an illustration of a perspective view of a typical composite beaded panel.

Referring first to FIG. 1, the disclosed embodiments provide a method of fabricating a part such as a beaded panel 20 formed of laminated plies of fiber reinforced polymer resin such as, without limitation, carbon fiber epoxy. The plies may be unidirectional fiber reinforced prepreg, or a dry, tackified cloth reinforcement that is laid up and subsequently infused with a polymer resin. The fiber reinforcement and the polymer resin comprising the plies may be any of a wide range of known materials. In the illustrated embodiment, the body 22 of the panel 20 is essentially flat, however the body 22 may have one or more curves or contours (not shown), depending upon the application. The panel 20 may be stiffened against bending moments about an axis substantially parallel to axis 23 by means of a plurality of beads 24 which are integrally formed into the body 22 of the panel 20 by a method described below. In this example, the beads 24 are elongate, and have their longitudinal axes 25 substantially aligned substantially perpendicular to the axis 23 of the panel 20. The number, size, pattern, alignment and location of the beads 24 may vary, depending on the application. For example, the beads 24 may be aligned in any direction relative to the axis 23. Groups of the beads may be staggered relative to each other, and may be arranged in patterns that are regular or irregular, or a combination of both. For example, the beads 24 could be staggered relative to each other, rather than being aligned as shown in FIG. 1, so as to increase the bending stiffness of the panel 20 about axis 23.

Figure 2:
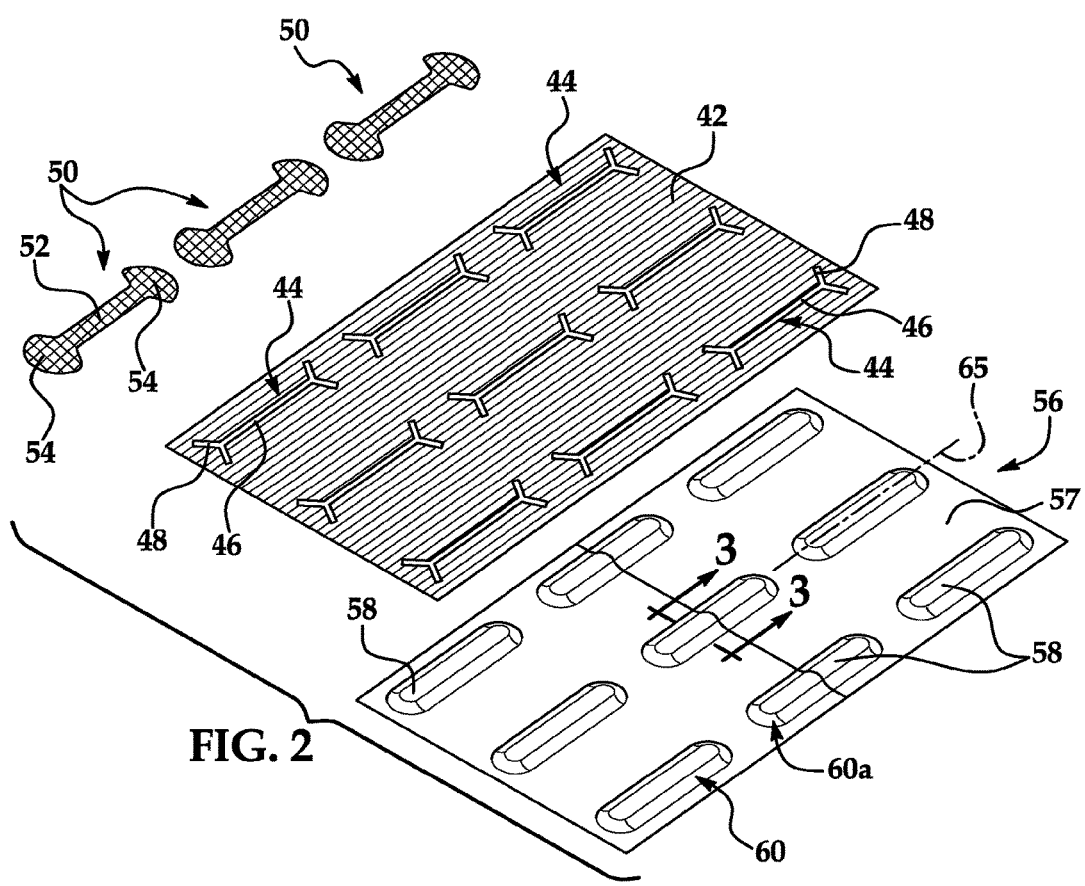
FIG. 2 is an illustration of an exploded view of a bead tool, a slit ply and patches.

Referring now to FIG. 2, the beaded panel 20 shown in FIG. 1 may be fabricated by laying up a plurality of plies 42 on a tool 56. Each of the plies 42 may be a unidirectional or bidirectional fiber reinforced prepreg, or a dry cloth (not shown) which is later infused with resin. In the example illustrated in FIG. 2, the ply 42 is a 0 degree unidirectional prepreg. The plies 42 may be laid up on the tool 56 according to a predefined ply schedule (not shown) which may define the number and layup orientation sequence of the plies 42, as well as the particular type of material used in each ply 42.

Figure 3:
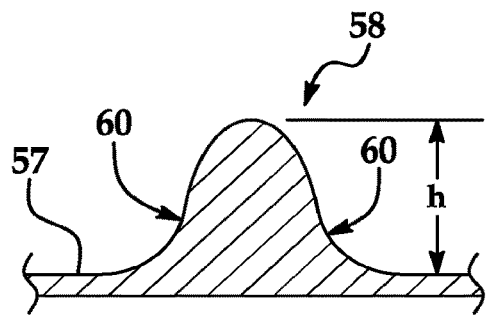
FIG. 3 is an illustration of a sectional view taken along the line 3-3 in FIG. 2.

The tool 56 may include a plurality of raised bead features 58 which are generally similar in shape to the beads 24 formed in the panel 20 shown in FIG. 1. As seen in FIG. 3, each of the bead features 58 is raised above a tool surface 57 by a height "h" and may include contoured sides 60 extending around the entire perimeter of the bead feature 58. In the example shown in FIG. 3, each of the bead features 58 has a cross section that is generally bell-shaped, however the cross sectional shape as well as the contours 60 of the bead features 58 may vary, depending upon the application, and the particular type of bead 24 that is to be formed in the panel 20.

Each of the plies 42 has an opening 44 formed therein at locations which overlie the bead features 58 when the ply 42 has been laid up on the tool 56. As will be discussed below in more detail, each of the openings 44 may include an elongate slit 46 and a pair of darts 48 on each end of the slit 46. The slits 46 and the darts 48 are strategically located such that forming of the plies 42 is confined mostly to single curvature forming, which may reduce wrinkles. Wrinkling may also be reduced as a result of the fact that the reinforcing fibers in the ply 42 do not have to traverse the entire additional length up and over the bead feature 58.

After the ply or plies 42 has been drawn down onto the tool 56, dry or prepreg cloth patches 50 are placed on the ply 42 covering the openings 44. In the illustrated example, the patches 50 are generally "dog-bone" shaped, comprising an elongate medial portion 54 which is intended to cover the slit 46, and enlarged, generally semi-circular end portions 52 which are respectively intended to cover the darts 48. Because the patches 50 are formed of cloth material, they may more easily conform to the compound curvature 60a at the ends of the bead features 58. The patches 50 function to splice together the open darts 48 in the underlying plies 42.

Figure 4:
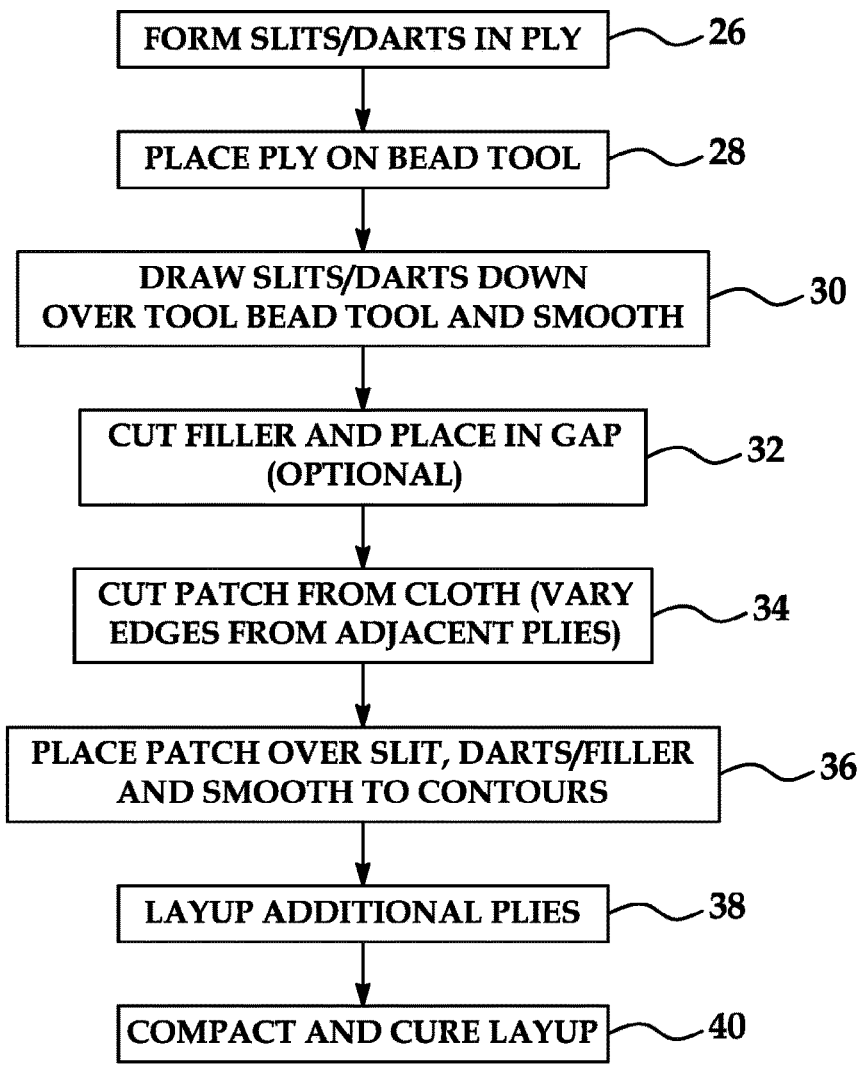
FIG. 4 is an illustration of a flow diagram of a method of fabricating a beaded panel.
Figure 5:
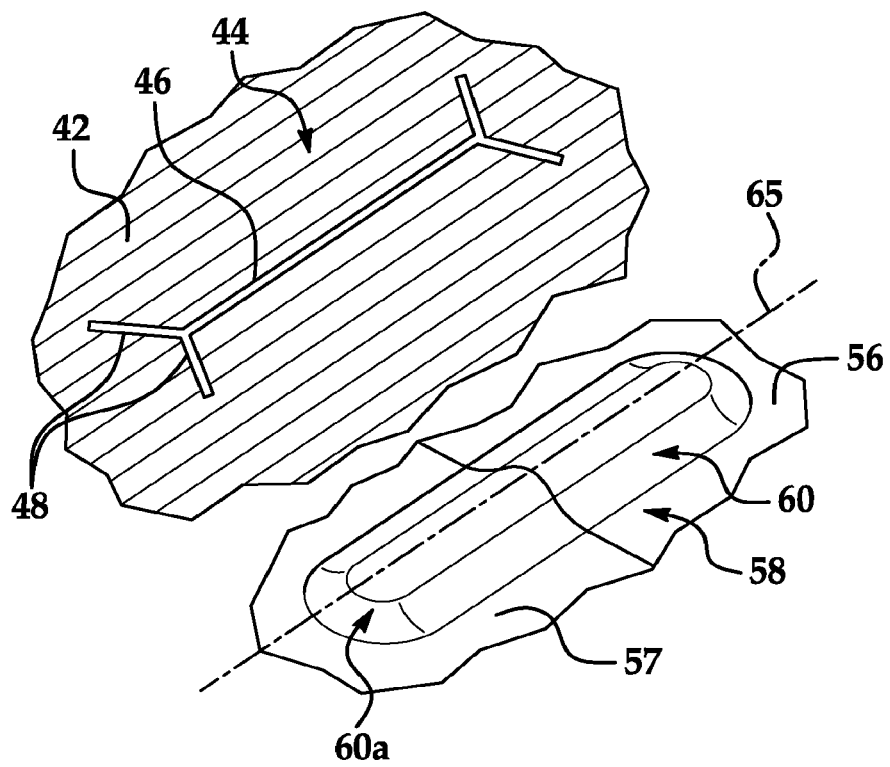
FIG. 5 is an illustration of a perspective view of a portion of a slit ply being placed onto a bead tool feature.

Referring now to FIGS. 4 and 5, a method of fabricating the beaded panel 20 (FIG. 1) begins at step 26 in which the openings 44 are formed in the ply 42. The openings 44 have a predetermined pattern, which in the illustrated example, as previously mentioned, comprise a slit 46 and darts 48 at the end of each slit 46. The slits 46 are substantially aligned with the central axis 65 of each bead feature 58. In some applications, it may be desirable to slightly stagger the openings 44 in the plies 42 so that the openings 44 are not vertically aligned in subsequently laid up plies 42. The slits 46 and darts 48 may be formed using any of various equipment, such as without limitation, laser cutters, die cutters, or other automated ply cutting equipment and techniques (all not shown) which may reduce processing times and improve part consistency.

Figure 6:
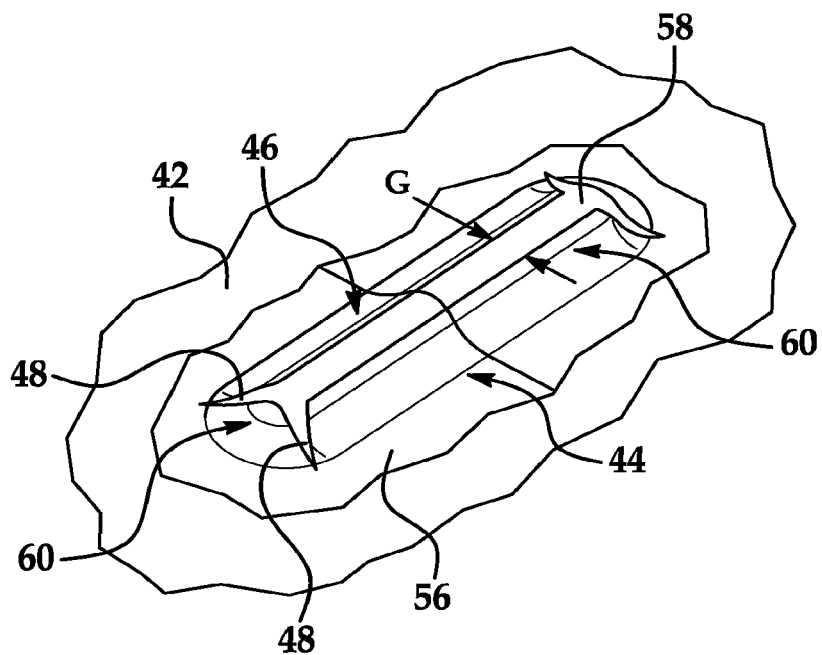
FIG. 6 is an illustration of a perspective view similar to FIG. 5, but showing the ply having been drawn down over the bead feature.

Next, at 28, the ply 42 is placed on the bead containing tool 56 as shown in FIG. 6 and the slit 46 and darts 48 are drawn down over the bead feature 58 at step 30. As the ply 42 is drawn down over the bead feature 58, the slit 46 and darts 48 allow the ply 42 to spread in the area surrounding the opening 44 so as to better conform to the contours 60 of the tool feature 58 and release tension in those fibers that would otherwise be required to travel up and over the bead feature 58. The ply 42 may be swept by hand or equipment so as to smooth any wrinkles (not shown) that might be present in the ply 42. As the ply 42 is drawn down onto the bead feature 58, the slit 46 may widen to form a gap "G".

Figure 7:
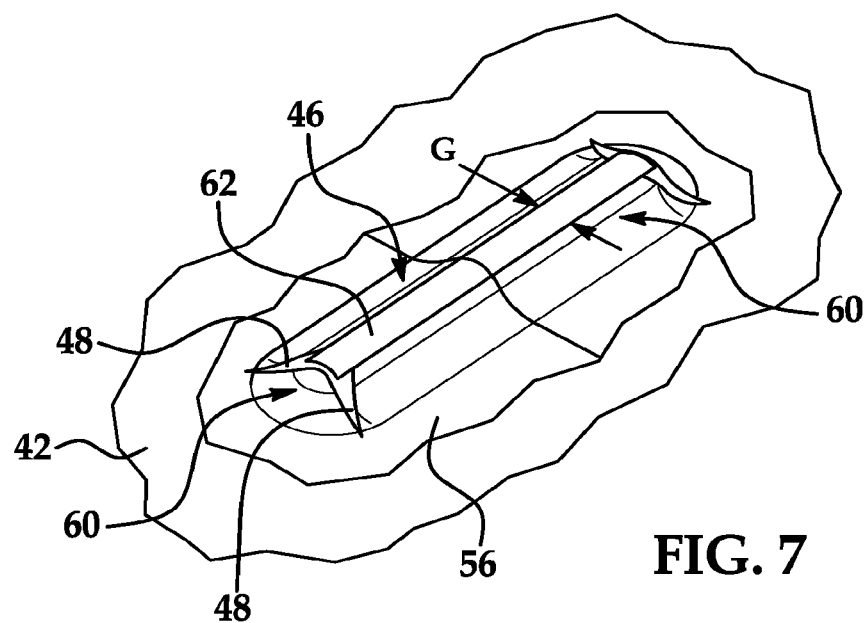
FIG. 7 is an illustration of a perspective view similar to FIG. 6 but showing an optional filler having been placed in a gap formed by widening of the slit.

Referring now to FIGS. 4 and 7, in some applications it may be desirable to at least partially fill the gap G. In order to fill or partially fill the gap G, an optional filler strip 62 of dry cloth or unidirectional prepreg, may be cut as shown at step 32 in FIG. 4, and placed in the gap G as shown in FIG. 7, thereby filling or partially filling the gap G formed by the widened slit 46. In some applications, the filler strip 62 may not be necessary.

Figure 8:
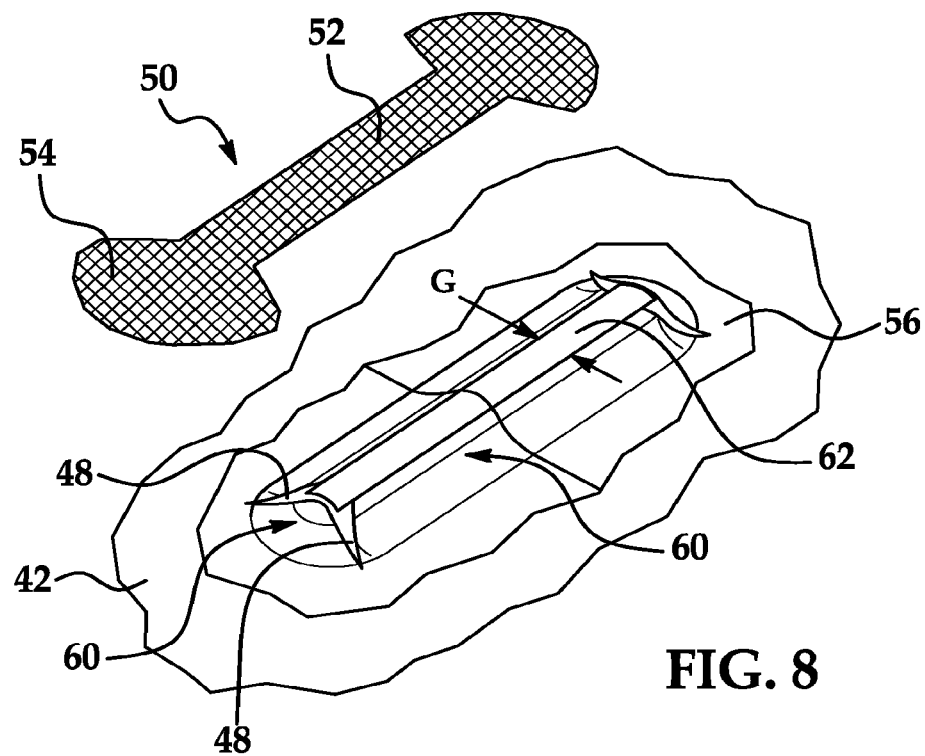
FIG. 8 is an illustration of a perspective view similar to FIG. 7 but showing a patch being readied for placement over the slit.

Referring now to FIGS. 4 and 8, at step 34, the patch 50 may be cut from a sheet (not shown) of dry or prepreg cloth such that the dimensions of the medial portion 52 and end portions 54 are sufficient to cover the filler strip 62 and the darts 48.

Figure 9:
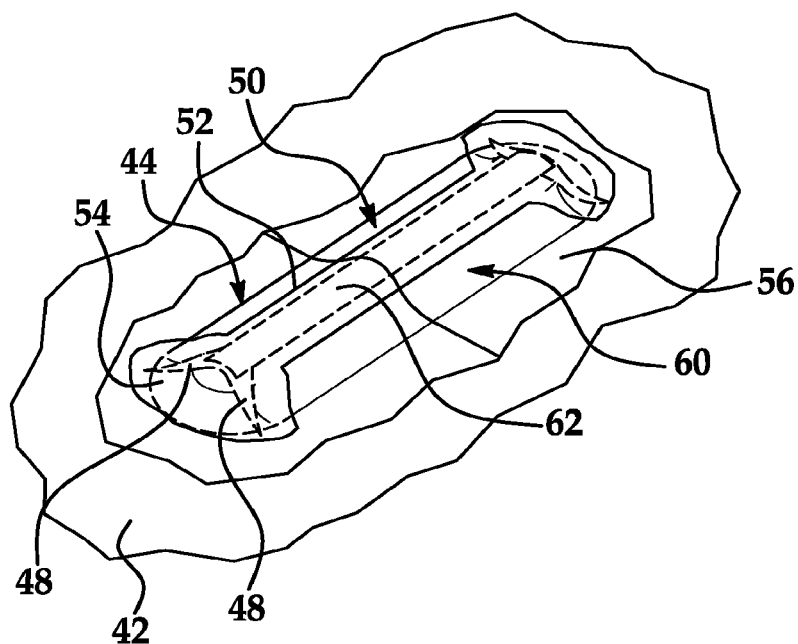
FIG. 9 is an illustration of a perspective view similar to FIG. 8, but showing the patch having been placed on the ply and covering the slit.
Figure 10:
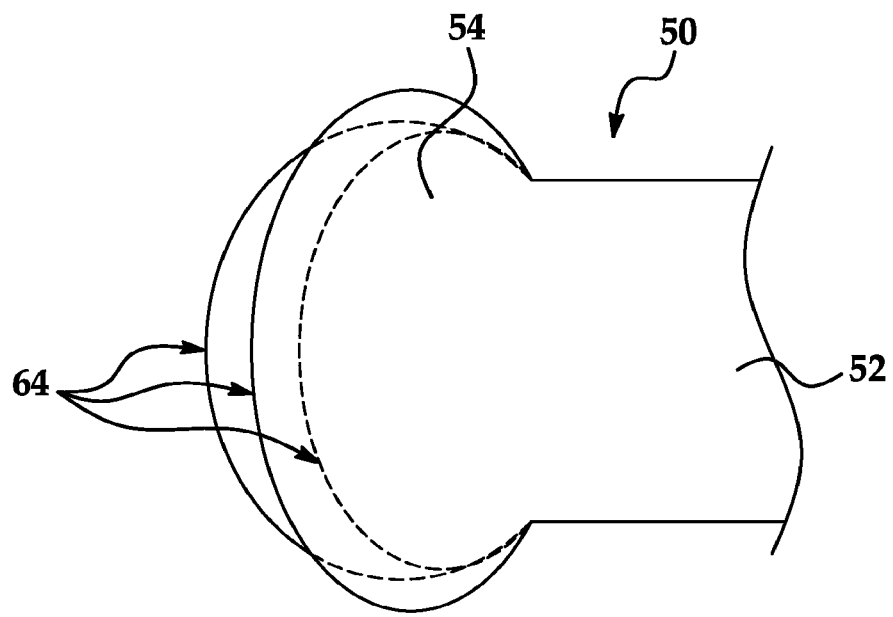
FIG. 10 is an illustration of a plan view of several overlying patches having edges staggered relative to each other.

Next, as shown in FIGS. 4 and 9, the patch 50 is placed over the filler strip 62 and darts 48, as shown at step 36. The patch 50 may be smoothed down over the contours 60 of the bead feature 58 so as to conformally cover the entire opening 44. As shown in FIG. 10, the end portions 54 of the patches 52 may be sized and cut so that the shape of their outer edges 64 are slightly different from each other. As a result, when the plies 42 are stacked, the outer edges 64 of the patches 52 are slightly staggered so as to minimize the local build-up of material within the layup, and improve the structural integrity of the stack.

Additional plies 42 are laid up, as shown at 38 in FIG. 4, by repeating steps 26-36 until all of the plies 42 have been laid up according to the applicable ply schedule. The completed layup may be compacted and cured at step 40.

Figure 11:
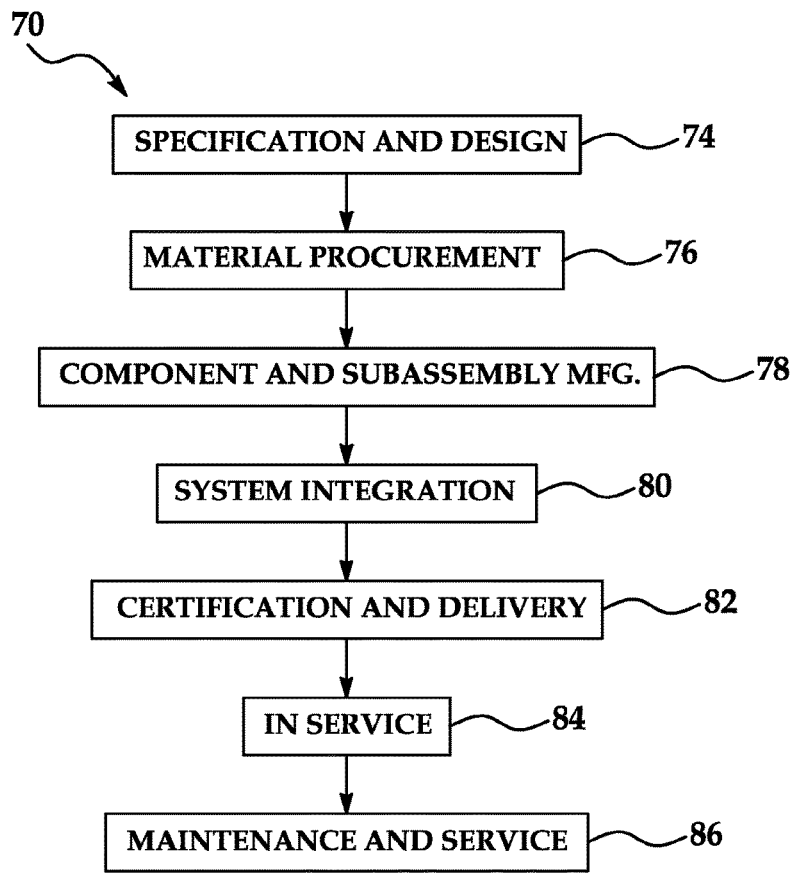
FIG. 11 is an illustration of a flow diagram of aircraft production and service methodology.
Figure 12:
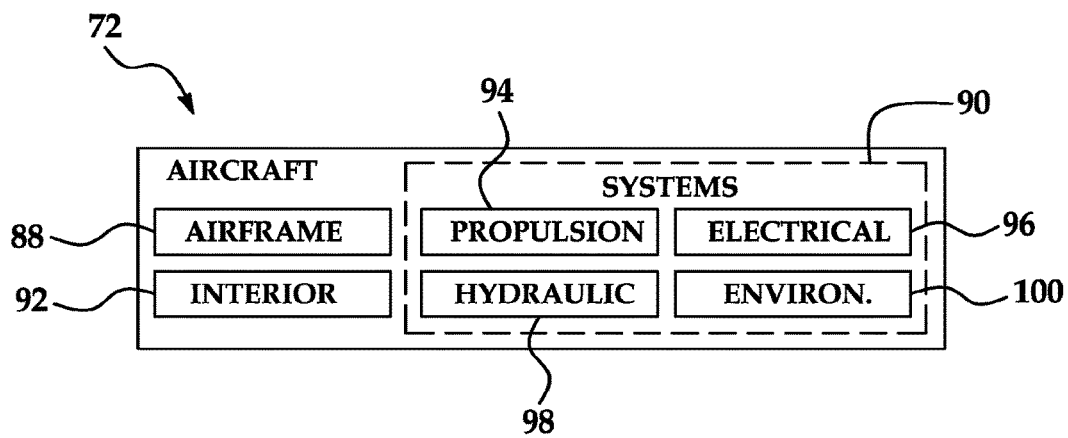
FIG. 12 is an illustration of a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 70 as shown in FIG. 11 and an aircraft 72 as shown in FIG. 12. During pre-production, exemplary method 70 may include specification and design 74 of the aircraft 72 and material procurement 76 in which the disclosed method may be specified for use in fabricating beaded parts. During production, component and subassembly manufacturing 78 and system integration 80 of the aircraft 72 takes place. The disclosed method and apparatus may be used to fabricate beaded parts or components that are then assembled and integrated with other subassemblies. Thereafter, the aircraft 72 may go through certification and delivery 82 in order to be placed in service 84. While in service by a customer, the aircraft 72 is scheduled for routine maintenance and service 86 (which may also include modification, reconfiguration, refurbishment, and so on). Beaded components fabricated by the disclosed method may be used to replace components on the aircraft 72 during the maintenance and service 86.

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 72 produced by exemplary method 70 may include an airframe 88 with a plurality of systems 90 and an interior 92. Examples of high-level systems 90 include one or more of a propulsion system 94, an electrical system 96, a hydraulic system 98, and an environmental system 100. Any number of other systems may be included. Although an aerospace example is shown, the principles of the disclosure may be applied to other industries, such as the marine and automotive industries.

Systems and methods embodied herein may be employed during any one or more of the stages of the production and service method 70. For example, beaded components or subassemblies corresponding to production process 78 may be fabricated or manufactured in a manner similar to components or subassemblies produced while the aircraft 72 is in service. Also, one or more method embodiments, or a combination thereof may be utilized during the production stages 78 and 80, for example, by substantially expediting assembly of or reducing the cost of an aircraft 72. Similarly, one or more method embodiments, or a combination thereof may be utilized while the aircraft 72 is in service, for example and without limitation, to maintenance and service 86.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A beaded composite part fabricated by the method of:
   forming at least one opening in at least one ply of a prepreg material or a composite dry fiber cloth;
   placing the at least one ply on a tool having a raised bead feature, wherein placing the at least one ply on the tool includes aligning and forcing the at least one opening down over the raised bead feature so as to substantially conform the at least one ply to a contour of the raised bead feature, and wherein forcing the at least one opening down over the raised bead feature produces a gap in the at least one ply;
   at least partially filling the gap with a filler;
   fabricating a composite patch; and
   placing the composite patch over a top of the at least one opening in the at least one ply.

2. A beaded composite part fabricated by:
   cutting slits in each of a plurality of plies of a prepreg material or a composite dry fiber cloth;
   laying up each of the plies on a bead tool having raised bead features, including aligning the slits in each ply respectively over the raised bead features;
   drawing each of the plies down over the raised bead features in the area of the slits so as to widen the slits into gaps;
   filling the gaps with fillers;
   fabricating patches;
   placing the patches respectively on the plies overlying over the fillers; and
   curing the laid-up plies.

3. The beaded composite part of claim 2, further comprising:
   cutting darts in each ply at each end of the slits.

4. The beaded composite part of claim 3, wherein fabricating the patches includes cutting a piece of prepreg cloth into shapes each having a medial portion covering the fillers and end portions covering the darts.

5. The beaded composite part of claim 2, wherein fabricating the patches includes:
   cutting a piece of prepreg into shapes having an outline that encompasses the slits, and
   varying the outline of the patches from ply-to-ply.

6. The beaded composite part of claim 3, wherein:
   cutting the darts includes cutting first and second darts in differing directions at each end of the slits which allow the slits to open as plies are drawn down onto the raised bead features,
   fabricating the patches includes cutting dog-bone shapes from a piece of prepreg cloth, and
   placing the patches over the slits includes placing ends of the dog-bone shapes over the darts.

7. The beaded composite part of claim 1 further comprising:
   aligning the at least one opening over the raised bead feature.

* * * * *